(12) United States Patent
Wang et al.

(10) Patent No.: US 12,548,542 B2
(45) Date of Patent: Feb. 10, 2026

(54) ACTIVE NOISE CANCELLER DEVICE

(71) Applicant: Honda Motor Co., Ltd., Tokyo (JP)

(72) Inventors: Xun Wang, Saitama (JP); Toshio Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 18/531,738

(22) Filed: Dec. 7, 2023

(65) Prior Publication Data

US 2024/0274112 A1 Aug. 15, 2024

(30) Foreign Application Priority Data

Feb. 13, 2023 (CN) .......................... 202310105976.4

(51) Int. Cl.
*G10K 11/178* (2006.01)
(52) U.S. Cl.
CPC .. *G10K 11/17815* (2018.01); *G10K 11/17823* (2018.01); *G10K 11/17825* (2018.01); *G10K 11/17881* (2018.01); *G10K 2210/1282* (2013.01); *G10K 2210/30231* (2013.01); *G10K 2210/3026* (2013.01); *G10K 2210/3027* (2013.01); *G10K 2210/3028* (2013.01)
(58) Field of Classification Search
CPC ............................................. G10K 2210/1082
See application file for complete search history.

(56) References Cited

U.S. PATENT DOCUMENTS

2019/0035380 A1\* 1/2019 Zafeiropoulos .. G10K 11/17817

FOREIGN PATENT DOCUMENTS

| JP | H0728474 | 1/1995 |
|---|---|---|
| JP | 4110783 | 7/2008 |
| JP | 2010070023 | 4/2010 |
| JP | 2021162849 | 10/2021 |
| JP | 2023131431 | 9/2023 |
| JP | 2023148050 | 10/2023 |

\* cited by examiner

*Primary Examiner* — Ping Lee
(74) *Attorney, Agent, or Firm* — JCIPRNET

(57) ABSTRACT

An active noise canceller device includes: a reference signal generation device, generating a reference signal corresponding to a noise; a cancellation sound output device, outputting cancellation sound for canceling the noise; an error detection device, detecting an error between the noise and the cancellation sound and generating an error signal corresponding to the error; and a control device, controlling the cancellation sound output device that further including: a reference signal correction part, correcting the reference signal; a noise estimation part, estimating a sound pressure; a sound pressure estimation part, estimating the sound pressure within an object range of the cancellation sound that cancels the noise; and a control filter, controlling the cancellation sound. The active noise canceller device updates the control filter based on the reference signal corrected by the reference signal correction part and a sound pressure estimated value of the sound pressure estimation part.

3 Claims, 9 Drawing Sheets

| Control point number n | Filter coefficient | | |
|---|---|---|---|
| 1 | No. | Coefficient | 170a |
| | 1 | 0.01 | |
| | 2 | −0.1 | |
| | ... | ... | |
| | L | 0.002 | 170a_1 |
| ... | ... | | |
| N | No. | Coefficient | |
| | 1 | 0.01 | |
| | 2 | −0.1 | 170a_n |
| | ... | ... | |
| | L | 0.002 | |

FIG. 7

ACTIVE NOISE CANCELLER DEVICE

CROSS-REFERENCE TO RELATED APPLICATION

This application claims the priority benefit of China application serial no. 202310105976.4, filed on Feb. 13, 2023. The entirety of the above-mentioned patent application is hereby incorporated by reference herein and made a part of this specification.

BACKGROUND

Technical Field

The disclosure relates to an active noise canceller device.

Description of Related Art

In recent years, efforts to provide access to sustainable transportation systems that also take into account vulnerable persons such as the elderly, the disabled, and children among traffic participants have been active. In order to achieve the stated purpose, research and development efforts are made to further improve the safety and convenience of transportation through development related to the habitability of vehicles.

Currently, an active noise canceller device is disclosed, which has a speaker that outputs cancellation sound (to cancel noise) and a microphone that outputs an error signal and generates a control signal based on the error signal that causes the speaker to output the cancellation sound.

The sound reduction effect is limited to a narrow range centered on the microphone, and the higher the object frequency, the narrower the sound reduction range. By increasing the amount of control microphone, the sound reduction range may be expanded, but the hardware settings of the system become larger, thereby increasing the cost.

Thus, in the habitability of vehicles, how to expand the sound reduction range of noise is the problem.

SUMMARY

The disclosure expands the sound reduction range of noise. Furthermore, this contributes to the development of sustainable transportation systems.

Based on the above description, the disclosure proposes an active noise canceller device, which may expand the sound reduction range of noise and improve the sound reduction (noise reduction) effect near the occupant's ear position.

According to one embodiment of the disclosure, an active noise canceller device is proposed to reduce spatial noise inside a moving body. The active noise canceller device includes: a reference signal generation device, generating a reference signal corresponding to a noise; a cancellation sound output device, outputting cancellation sound for canceling the noise; an error detection device, detecting an error between the noise and the cancellation sound and generating an error signal corresponding to the error; and a control device, controlling the cancellation sound output device according to the reference signal and the error signal. The control device further includes: a reference signal correction part, configured to correct the reference signal; a noise estimation part, estimating a sound pressure before controlling a position of the error detection device through the cancellation sound output from the cancellation sound output device and the error signal output from the error detection device; a sound pressure estimation part, estimating the sound pressure within an object range of the cancellation sound that cancels the noise; and a control filter, controlling the cancellation sound. The active noise canceller device updates the control filter based on the reference signal corrected by the reference signal correction part and a sound pressure estimated value of the sound pressure estimation part.

According to the above embodiment, the control range of noise reduction may be expanded without increasing the amount of the microphone (error detection device). Furthermore, the area to implement a high sound reduction amount within the object range may be freely adjusted. Moreover, by correctly recognizing the correction characteristic, the acoustic power within the object range may be more accurately estimated from the signal of the microphone position. In addition, according to the control point, necessary acoustic characteristics and correction characteristics may be stored in the control device.

BRIEF DESCRIPTION OF THE DRAWINGS

FIG. 7 shows the storage schematic diagram of each correction and acoustic characteristic.

DESCRIPTION OF THE EMBODIMENTS

Figure 1:
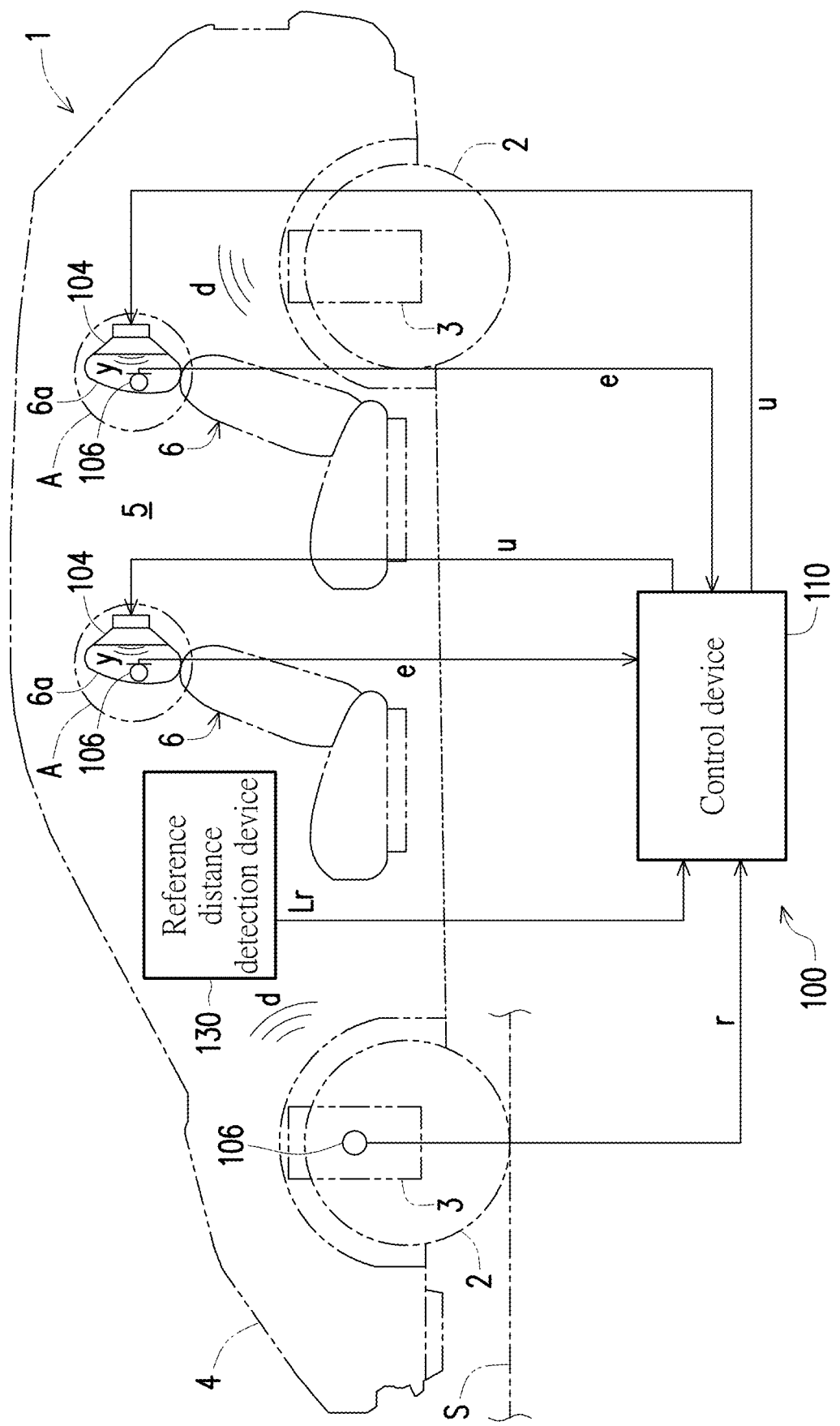
FIG. 1 is a schematic diagram showing the moving body to which the active noise canceller device in the embodiment of the disclosure is applied.

References of the exemplary embodiments of the disclosure are to be made in detail. Examples of the exemplary embodiments are illustrated in the drawings. If applicable, the same reference numerals in the drawings and the descriptions indicate the same or similar parts.

According to one embodiment of the disclosure, the active noise canceller device further includes: a reference distance detection device, configured to detect a reference distance from the cancellation sound output device to a head position of an occupant. The sound pressure estimation part sets the object range from the reference distance and updates the control filter.

According to one embodiment of the disclosure, in the active noise canceller device, the control device further includes: a sound pressure weight setting part, correcting the sound pressure estimated value based on the object range.

According to one embodiment of the disclosure, in the active noise canceller device, the control device further includes: a head position detection part, detecting the head position of the occupant; and a sound pressure weight setting part, correcting the sound pressure estimated value based on the object range and the head position.

FIG. 1 is a schematic diagram showing the moving body to which the active noise canceller device in the embodiment of the disclosure is applied. Taking the vehicle 1 as an example of a moving body, when the wheel 2 of the vehicle vibrates due to the force from the pavement S, and the vibration of the wheel 2 is transmitted to the vehicle body 4 through the suspension 3, a road noise d (hereinafter referred to as noise d) is generated in the vehicle interior 5. The active noise canceller device 100 of the embodiment is an ANC device (active noise control device) for reducing such road noise d. More specifically, the active noise canceller device 100 reduces the road noise d by generating a cancellation sound y having a phase opposite to that of the road noise d and causing the generated cancellation sound y to interfere with the road noise d. Also, in addition to reducing the noise d generated by the road when the vehicle 1 is traveling, the active noise canceller device 100 may also reduce other noise (e.g., aerodynamic noise transmitted from the undercover attached to the lower side of the vehicle body 4).

Figure 2:
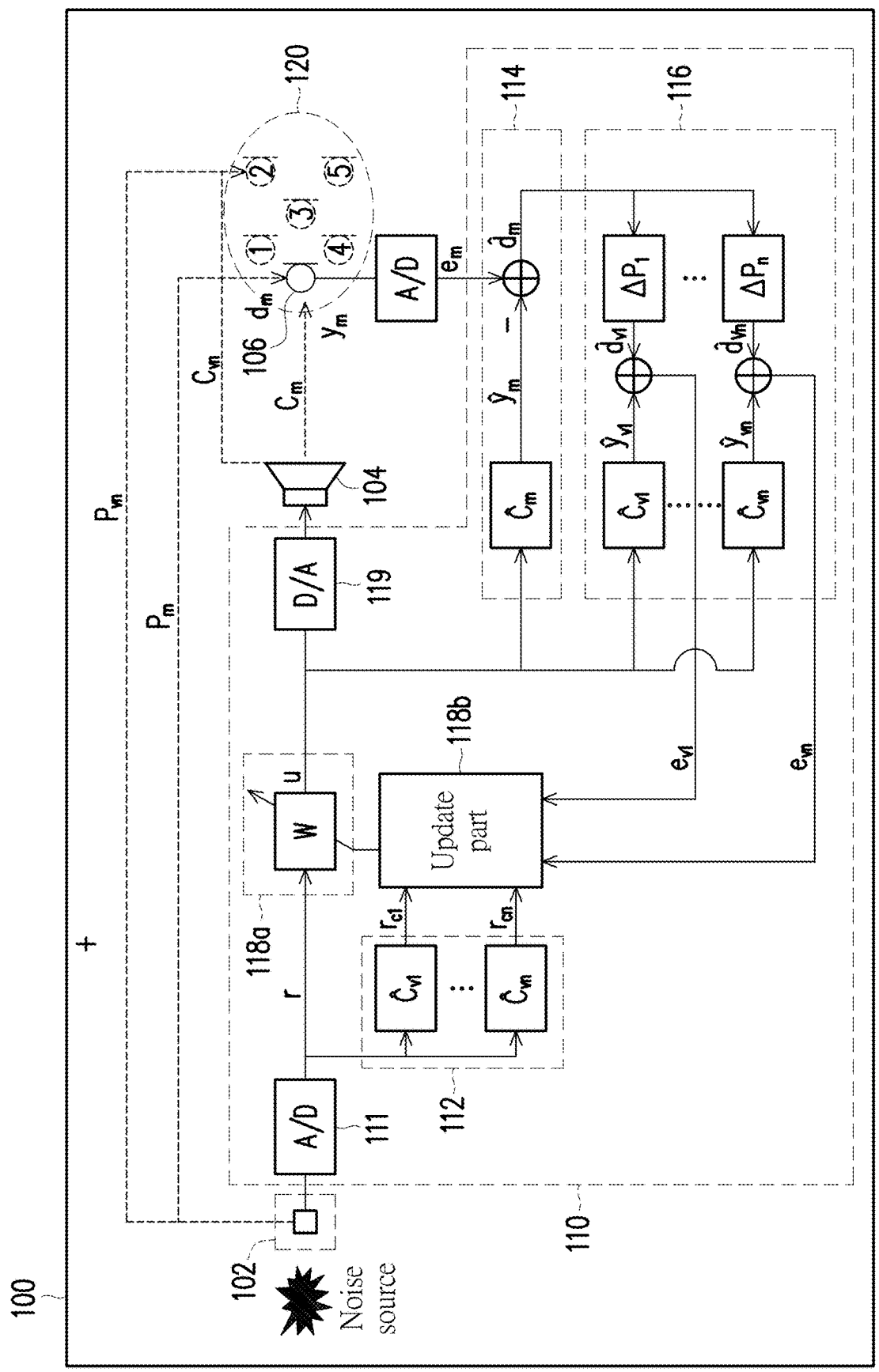
FIG. 2 is a circuit configuration schematic diagram of the active noise canceller device according to the embodiment of the disclosure.

FIG. 2 is a schematic diagram of the circuit of the active noise canceller device according to one embodiment of the disclosure. As shown in FIG. 2, the active noise canceller device 100 at least includes but is not limited to a reference signal generation device 102, a cancellation sound output device 104, an error detection device 106, and a control device 110. Here, the control device 110 of the active noise canceller device 100 is, for example, an electronic control unit (ECU) including an arithmetic processing unit (processor such as CPU and MPU) and a storage device (memory such as ROM and RAM). The control device 110 may be configured with one piece of hardware or may be configured with multiple pieces of hardware forming a unit.

The reference signal generating device 102 generates a reference signal r corresponding to the noise. The reference signal generating device 102 may be, for example, a vibration sensor provided on the suspension 3 of the vehicle 1 or other components that may achieve the same function.

The cancellation sound output device 104 outputs a cancellation sound $y_m$ for canceling the noise $d_m$. As an example, the cancellation sound output device 104 may be configured with a speaker. The cancellation sound output device 104 is, for example, a speaker that may be provided in the headrest 6a of the seat 6 of the vehicle interior 5. In other embodiment, the cancellation sound output device (speaker) 104 may also be installed in a position other than the headrest 6a.

The error detection device 106 is configured to detect the error between the noise $d_m$ and the cancellation sound $y_m$ and generate an error signal $e_m$ corresponding to the error. As an example, the error detection device 106 may be configured with a microphone. The error detection device 106 may be, for example, provided in the headrest 6a of the seat 6. In other embodiment, the error detection device 106 may also be installed in a position other than the headrest 6a.

The control device 110 represents the error detection device 106 (microphone) based on the reference signal r and the subscript m of the error signal, and the subscript n represents each of the virtual control points (hereinafter referred to as the control points) within the object range 120. The error signal $e_m$ controls the cancellation sound output device 104 to output the cancellation sound $y_m$.

According to the embodiment of the disclosure, the error detection device 106 adopts, for example, one noise detection microphone and also provides the object range 120, which includes the virtual control points n (five are shown in FIG. 1 as an example) for noise cancellation. The cancellation sound output device 104 outputs the cancellation sound $y_m$ for the noise $d_m$ detected by the noise detection microphone (i.e., the error detection device) 106 and also generates the cancellation sound $y_{vn}$ for each of the control points n. The active noise canceller device 100 simultaneously estimates the acoustic characteristic $P_m$ of the error detection device 106 and also estimates the acoustic characteristic $P_{vn}$ of each of the control points n. In addition, the position of each of the control points has corresponding acoustic characteristic $C_{vn}$, and the position of the error detection device 106 also has corresponding acoustic characteristic $C_m$.

According to the embodiment of the disclosure, the control device 110 further includes a reference signal correction part 112, a noise estimation part 114, a sound pressure estimation part 116, and a control filter 118a. The embodiment of the disclosure utilizes a control method that reduces the acoustic power $J_P$ within the object range 120. The following is a brief description.

First, the acoustic power $J_P$ is proportional to the square sum of the sound pressure $p_n$ within the object range 120. The sound pressure $p_n$ is the result of the mutual interference between the noise d and the cancellation sound y and becomes the error signal $e_n$ that controls the system. The equation for the acoustic power $J_P$ and the sound pressure $p_{vn}$ of each of the control points n within the object range 120 are as shown in the following equations (1) and (2). $e_{vn}$ is the error signal, $y_{vn}$ is the cancellation sound of each of the control points, W is the control filter coefficient, $C_{vn}$ is the acoustic characteristic from the cancellation sound output device (speaker) 104 to each of the control points, and * represents the convolution operation. $d_{vn}$ represents the noise signals of the control point.

$$J_P \propto \sum\nolimits_{n=1}^{N} p_{vn}^2, \tag{1}$$

$$p_{vn} = e_{vn} = d_{vn} + y_{vn} = d_{vn} + r * W * C_{vn} \tag{2}$$

In addition, in the acoustic power control, an adaptive algorithm (e.g., LMS) is used to update the coefficient of the control filter (W) 118a, so as to minimize the acoustic power $J_P$, which is shown in the following equations (3) and (4). t is discrete time.

$$\frac{\partial J_P}{\partial w} = 2\sum\nolimits_{n=1}^{N} e_{vn}\left(r * \hat{C}_{vn}\right) \tag{3}$$

$$W(t+1) = W(t) - 2\mu \sum\nolimits_{n=1}^{N} e_{vn}\left(r(t) * \hat{C}_{vn}\right) \tag{4}$$

The reference signal correction part 112 is used to correct the reference signal r to generate corresponding correction reference signals $r_{c1}, r_{c2}, \ldots, r_{cn}$ for each of the control points n=1 to 5 (5 points are shown as an example herein, but is not intended to limit the scope of embodiment of the disclosure) within the object range 120. The reference signal r from the reference signal generation device 102 is input to the control device 110, converted into a digital signal through the A/D converter 111, and input to the reference signal correction part 112. Then, based on the following equation (5), the correction reference signals $r_{c1}, r_{c2}, \ldots, r_{cn}$ corresponding to each of the control points are calculated; that is, based on the acoustic characteristics $\hat{C}_{v1}, \hat{C}_{v2}, \ldots, \hat{C}_{vn}$ corresponding to each of the control points, the correction reference signals $r_{c1}, r_{c2}, \ldots, r_{cn}$ are generated. After that, the result is transmitted to the control filter update part 118b to update the coefficient of the control filter 118a.

$$r_{cn}(t) = r(t) * \hat{C}_{vn} \quad (5)$$

Regarding the reference signal correction, the previously measured acoustic characteristic $\hat{C}_{vn}$ from the control speaker to each of the control points n is used to correct the reference signal r.

The noise estimation part 114 estimates the sound pressure before controlling the position of the error detection device 106 through the cancellation sound $y_m$ output from the cancellation sound output device (speaker) 104 and the error signal $e_m$ output from the error detection device (microphone) 106. The control filter 118a outputs the control signal u to the noise estimation part 114, and the control signal u generates a cancellation sound signal $\hat{y}_m$ based on the acoustic characteristic $\hat{C}_m$ of the cancellation sound output device 104. After that, the noise signal $\hat{d}_m(t)$ before being controlled is outputted through an adder based on the error signal $e_m$ and the cancellation sound signal $\hat{y}_m$.

In addition, the noise signal $\hat{d}_m(t)$ before being controlled at the microphone point may be estimated by the following equation (6). Afterwards, the noise signal $\hat{d}_m(t)$ is provided to the sound pressure estimation part 116.

$$\hat{d}_m(t) = e_m(t) - \hat{y}_m(t) = e_m(t) - u(t) * \hat{C}_m \quad (6)$$

The sound pressure estimation part 116 estimates the sound pressure in the object range 120 where the noise $d_m$ is canceled by the cancellation sound $y_m$, that is, the sound pressure at each of the control points n (n=1 to 5 in this example) is estimated. As shown in FIG. 2, the sound pressure estimation part 116 may include n processing paths, and the circuit configuration of each of the processing paths is the same. The control filter 118a outputs the control signal u to the sound pressure estimation part 116. In each of the processing paths, the control signal u generates the cancellation sound signal $\hat{y}_{v1}, \ldots$ and $\hat{y}_{vn}$ based on the acoustic characteristics $\hat{C}_{v1}$ and $\ldots, \hat{C}_{vn}$ at each of the control points n.

In addition, the sound pressure estimation part 116 estimates the sound pressures $\hat{d}_{v1}, \ldots, \hat{d}_{vn}$, before being controlled at each of the control points n by multiplying the noise signal $\hat{d}_{vm}$ from the noise estimation part 114 by the correction characteristics $\Delta P1, \ldots, \Delta P_n$, and at each of the processing paths, the error signals $e_{v1}, \ldots, e_{vn}$ of each of the control points n are generated by respective adders based on the cancellation sound signals $\hat{y}_{v1}, \ldots$ and $\hat{y}_{vn}$ and the sound pressures $\hat{d}_{v1}, \ldots, \hat{d}_{vn}$ before being controlled at each of the control points n. Afterwards, the error signals $e_{v1}, \ldots, e_{vn}$ of each of the control points n are transmitted to the control filter update part 118b to update the coefficient of the control filter 118a.

In addition, in the above description, the error signals $e_{v1}, \ldots, e_{vn}$ and the correction characteristics $\Delta P1, \ldots, \Delta P_n$ at each of the control points n may be estimated by the following equations (7) and (8). Here, P represents the acoustic characteristic from the noise source to the microphone point and the control point. $\Delta P$ represents the ratio of the acoustic characteristic from the noise source to the control point and the acoustic characteristic from the noise source to the microphone point and is used as the correction characteristic to estimate the control point noise signal from the microphone point noise signal.

$$e_{vn}(t) = \hat{d}_{vn}(t) + \hat{y}_{vn} = \hat{d}_m(t) * \Delta P_n + u * \hat{C}_{vn} \quad (7)$$

$$\Delta P_n = \frac{P_{vn}}{P_m} \quad (8)$$

The control filter 118 may generate the control signal u based on the reference signal r, thereby controlling the generation of the cancellation sound $y_m$ for the noise $d_m$ detected by the noise microphone (error detection device) 106. In addition, as mentioned above, the coefficients of the control filter 118 may be adaptively updated through the control filter update part 118 based on the correction reference signal and the error signal $e_{vn}$ at each of the control points n to generate the corresponding control signal u. That is, based on the sound pressure estimated value of the sound pressure estimation part 116, the control filter is updated.

According to the above embodiment, the control area is expanded by controlling the acoustic power within the object range (virtual control point) 120. This ensures that the occupant does not feel any difference in sound reduction amount even if he/she moves slightly. In addition, by estimating the acoustic power within the object range from only one microphone's signal, a large range may be controlled without increasing the number of the microphone.

Based on the above configuration, the coefficient of the control filter (e.g., configured with a finite impulse response filter (FIR)) is updated by using the estimated values of the sound pressure estimated value of the noise estimation part (microphone point noise estimation part) 114 and the sound pressure estimated value (the object range of sound reduction where noise may be canceled by the cancellation sound) of the sound pressure estimation part 116. Thus, the acoustic power within the object range may be controlled. In addition, since the control filter is updated based on the estimated value, the sound reduction range may be expanded and the merchantability is improved.

According to another embodiment of the disclosure, as shown in FIG. 1, the active noise canceller device 100 further includes a reference distance detection device 130 for detecting a reference distance Lr from the cancellation sound output device 104 to the head position of the occupant. The sound pressure estimation part 116 may set the object range 120 from the reference distance Lr and update the coefficient of the control filter 118a.

The reference distance detection device 130 of the active noise canceller device 100 is configured with, for example, a driver monitoring system (DMS) provided with an occupant camera for photographing the occupant. The reference distance detection device 130 detects the reference distance Lr based on the occupant image captured by the occupant camera and outputs the detected reference distance Lr to the control device 110 of the active noise canceller device 100. In addition, in other embodiments, the reference distance detection device 130 may also be configured with a distance sensor that directly detects the reference distance Lr.

Based on the above configuration, the coefficient of the control filter is updated by using the estimated values of the sound pressure estimated value of the noise estimation part and the sound pressure estimated value of the sound pressure estimation part (object range=near the head position of the occupant). Thus, the object range may be controlled using the head position of the occupant as a reference.

Figure 3:
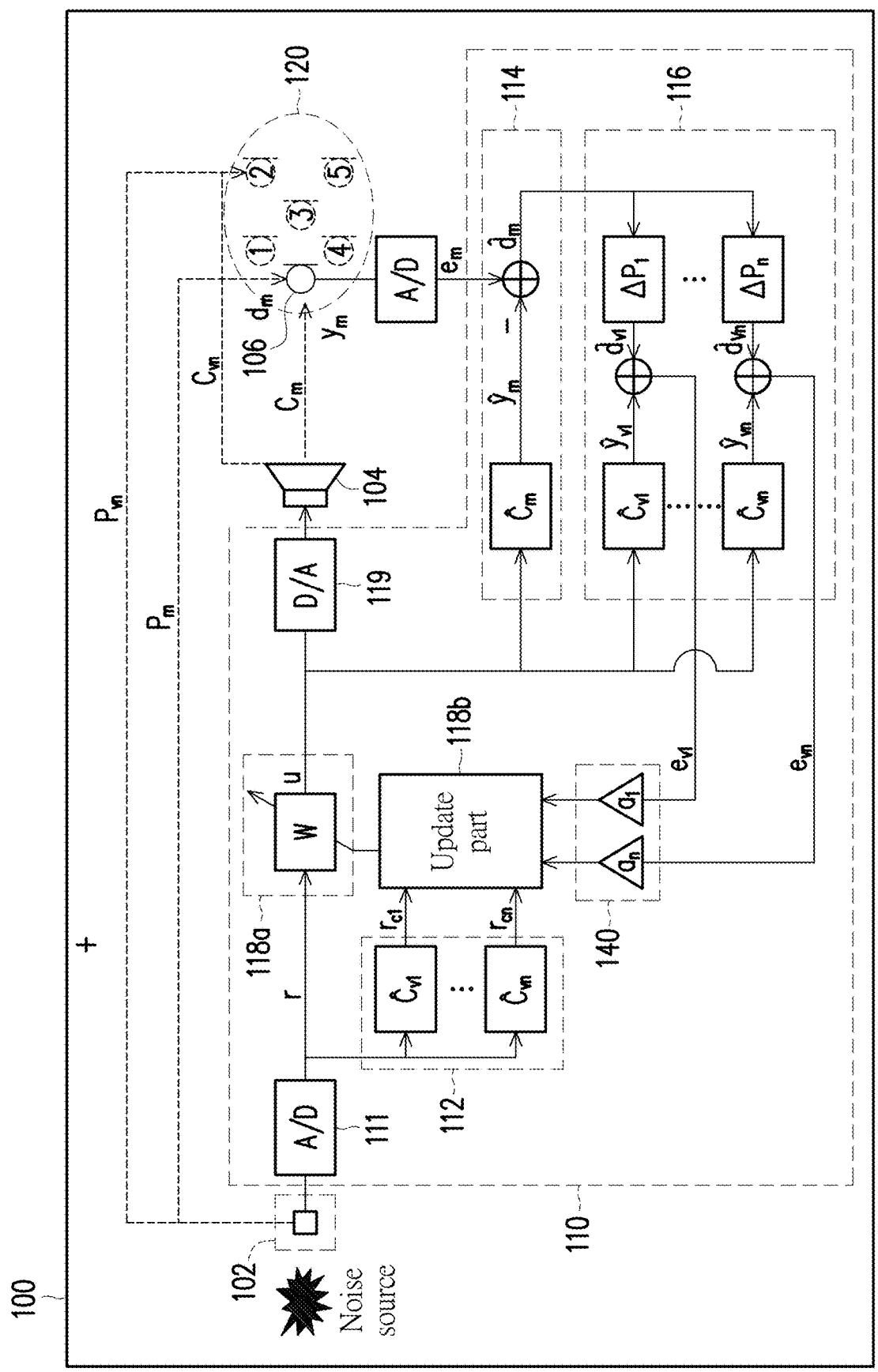
FIG. 3 is a circuit configuration schematic diagram of the active noise canceller device according to another embodiment of the disclosure.

FIG. 3 is a circuit configuration schematic diagram of the active noise canceller device according to another embodiment of the disclosure. As shown in FIG. 3, this embodiment is a variation of the embodiment shown in FIG. 2. In this embodiment, in addition to adding the sound pressure weight setting part 140, other parts are the same as the configuration shown in FIG. 2, and the operation method is also the same, so the description of the same parts is omitted.

The sound pressure weight setting part 140 corrects the sound pressure estimated value based on the object range 120. This sound pressure weight setting part 140 attaches a weighting value $a_n$ to the sound pressure of each of the control points n. For example, the closer the control point is to the ear position of the occupant, the larger the weighting value is, and the farther away from the ear, the smaller the weighting value is.

The acoustic power $J_P$, the sound pressure $p_{vn}$, etc. of each of the control points n of this embodiment may be modified as shown in the following equations (9) and (10). In the equation, $a_n$ is the weighting value of each of the control points n, and the meanings of the other items are the same as mentioned above.

$$J_P \propto \sum_{n=1}^{N} a_n p_{vn}^2, \tag{9}$$

$$p_{vn} = e_{vn} = d_{vn} + y_{vn} = d_{vn} + r * W * C_{vn} \tag{10}$$

Similarly, taking into account the weighting value of each of the control points, the calculation method of updating the coefficient of the control filter 118a is also modified accordingly, as shown in the following equations (11) and (12). In the equation, $a_n$ is the weighting value of each of the control points n, and the meanings of the other items are the same as mentioned above.

$$\frac{\partial J_P}{\partial w} = 2 \sum_{n=1}^{N} a_n e_{vn}(r * \hat{C}_{vn}) \tag{11}$$

$$W(t+1) = W(t) - 2\mu \sum_{n=1}^{N} a_n e_{vn}(t)(r(t) * \hat{C}_{vn}) \tag{12}$$

The above configuration enables weighting of the sound pressure in a part within the sound reduction range where a high sound reduction amount (cancellation sound) is to be implemented, so that a high sound reduction effect may be achieved in the object range 120 (within a pre-determined range=near the ear position, etc.), improving the merchantability of the product.

Figure 4:
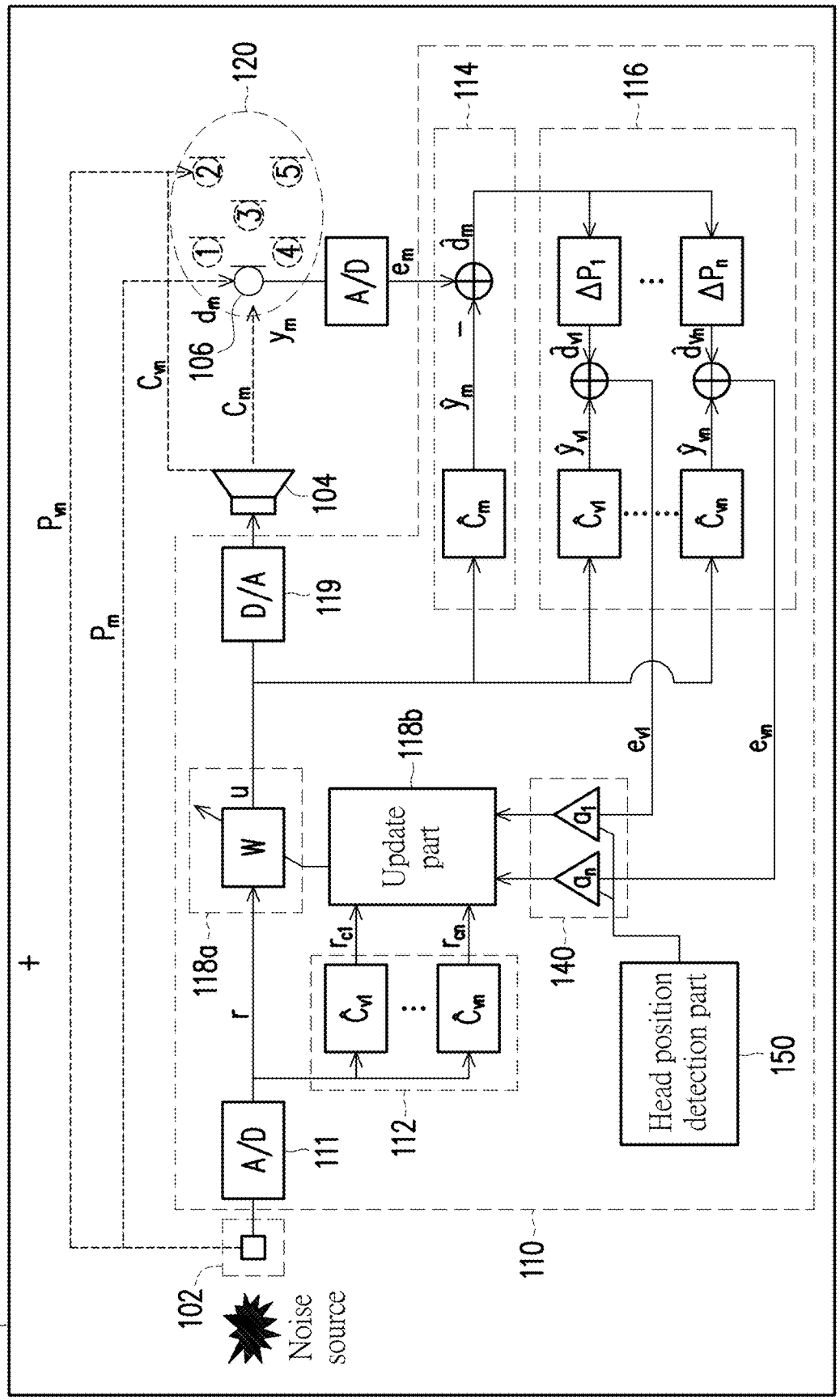
FIG. 4 is a circuit configuration schematic diagram of the active noise canceller device according to another embodiment of the disclosure.

FIG. 4 is a circuit configuration schematic diagram of the active noise canceller device according to another embodiment of the disclosure. As shown in FIG. 4, this embodiment is a variation of the embodiment shown in FIG. 2. In this embodiment, a head position detection part 150 and a sound pressure weight setting part 160 are added, other parts are the same as the configuration shown in FIG. 2, and the operation method is also the same, so the description of the same parts is omitted.

In this embodiment, the control device 110 further includes: the head position detection part 150 and the sound pressure weight setting part. The head position detection part 150 is configured to detect the head position of the occupant. The sound pressure weight setting part 160 corrects the sound pressure estimated value based on the control point n of the object range 120 and the head position.

Compared to the example shown in FIG. 3, the difference is that the weighting value of each of the control points n of this embodiment not only considers the position of each of the control points, but also further considers the head position of the occupant. For example, a control point close to the head position may be set to have a large weighting value. Thus, the sound reduction may be performed more effectively.

In this embodiment, the head position detection part 150 may also be configure with a driver monitoring system (DMS) or a distance sensor.

The above configuration enables weighting of the sound pressure in a part within the sound reduction range where a high sound reduction amount (cancellation sound) is to be implemented, moreover, by tracking the occupant's head position (specifically, the ear position), a high sound reduction effect may always be achieved near the head position, improving merchantability.

Next, the method for obtaining the above correction characteristic ΔP (acoustic characteristic from the noise source to the control point) and ΔC (acoustic characteristic from the control speaker to the control point) is described.

Figure 5A:
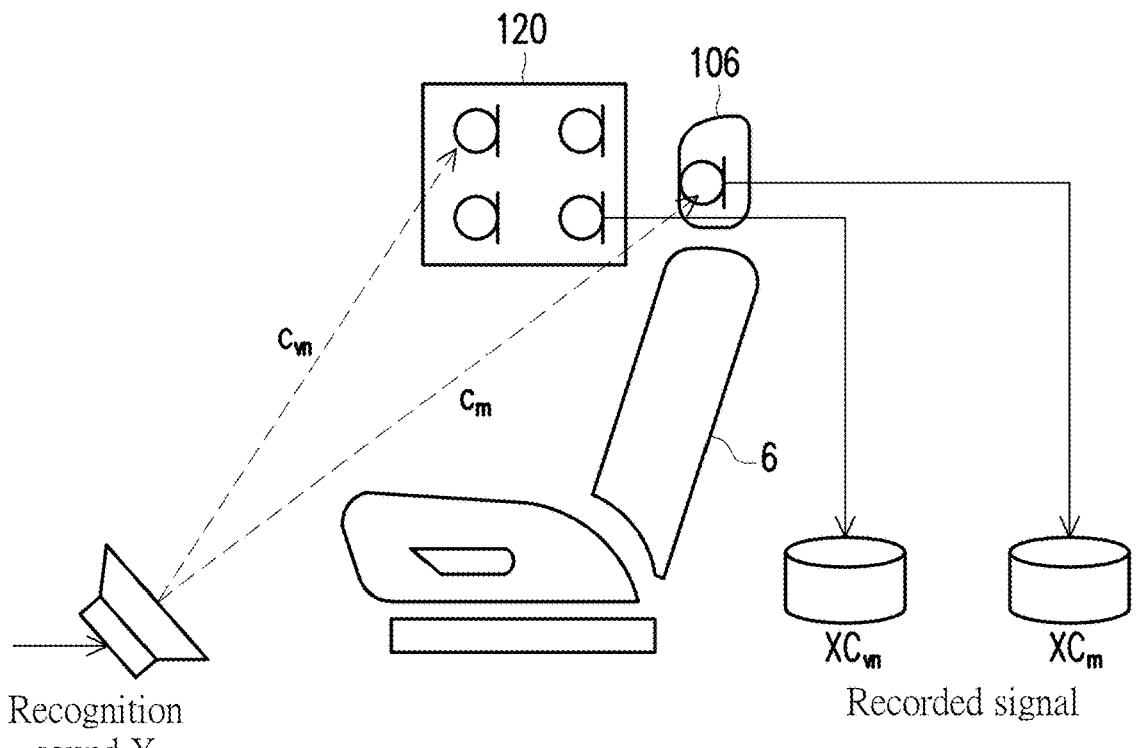
FIG. 5A and FIG. 5B show the correction method of acoustic characteristics.
Figure 5B:
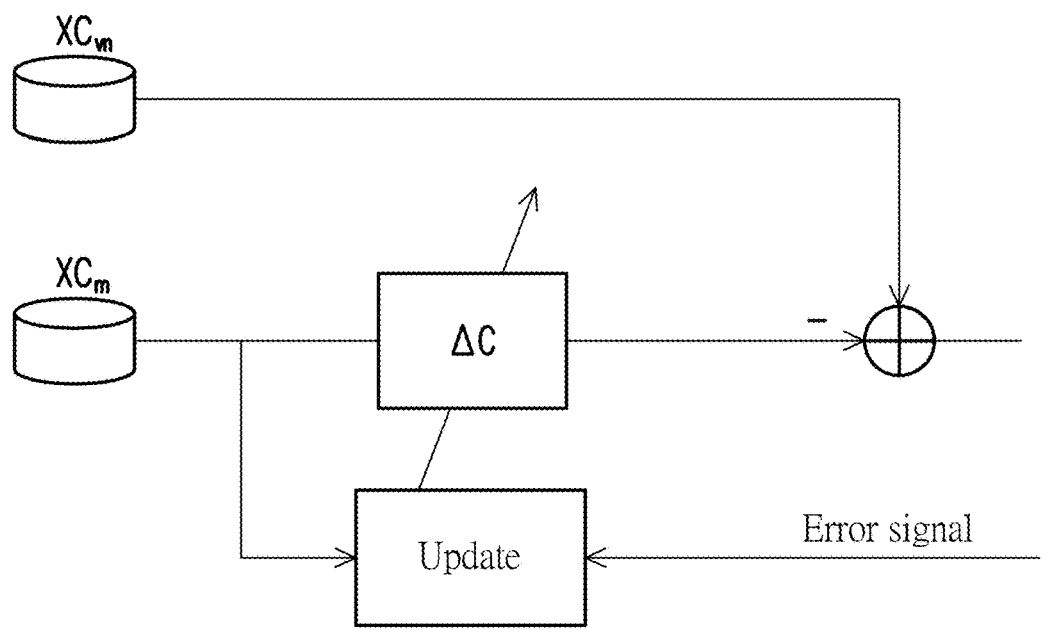

FIG. 5A and FIG. 5B show how to find the corrected characteristic ΔC. As shown in FIG. 5A, a recognition sound x is emitted from the control speaker. Next, when the recognition sound x reaches the position of the noise detection microphone (error detection device) 106 and the position of the control point n, the sound signals xCvn (control point) and xCm (microphone) at the position are recorded. Afterwards, characteristic recognition is then performed. As shown in FIG. 5B, the sound signal xCm is used as the input signal, and the adaptive algorithm is used to adaptively update the corrected characteristic ΔC such that the output of the corrected characteristic ΔC becomes xCvn. The updated result is used as the correction characteristic ΔC.

Figure 6A:
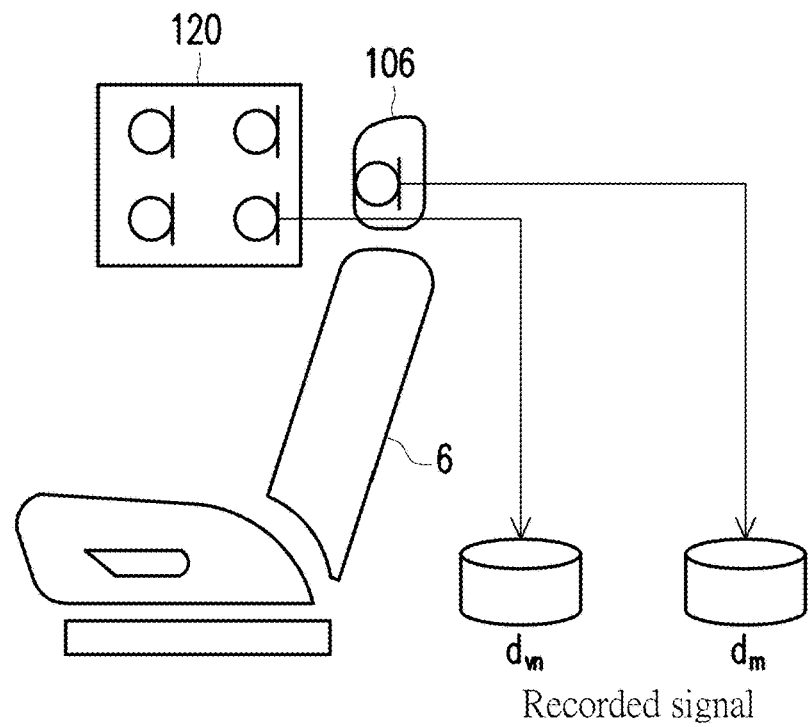
FIG. 6A and FIG. 6B show the correction method of acoustic characteristics.
Figure 6B:
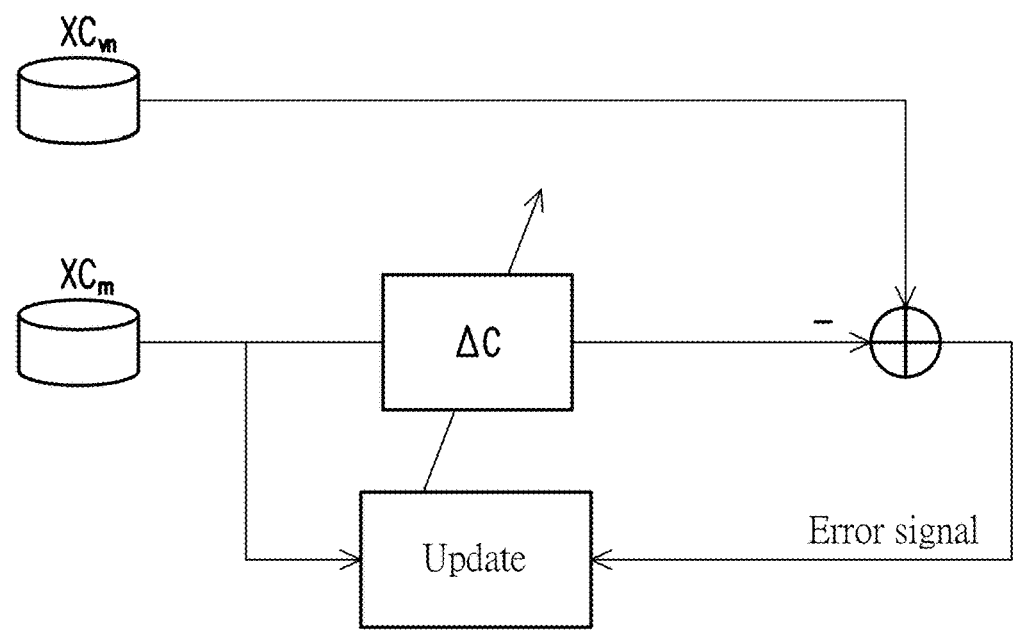

FIG. 6A and FIG. 6B show how to find the corrected characteristic ΔP. As shown in FIG. 6A, first, the vehicle is caused to travel on one side, while the noise at the position of the noise detection microphone (error detection device) 106 and noise at the position of the control point n are recorded as the noise signal $d_m$ (microphone) and the noise signal $d_{vn}$ (control point). Next, characteristic recognition is performed. As shown in FIG. 6B, the noise signal $d_m$ is used as the input signal, and the adaptive algorithm is used to adaptively update the corrected characteristic ΔP such that the output of the corrected characteristic ΔP becomes noise signal $d_{vn}$. The updated result is used as the correction characteristic ΔP.

FIG. 7 shows the storage schematic diagram of each correction and acoustic characteristic. Based on the correction characteristics ΔP, ΔC, the acoustic characteristic Ĉ, the filter coefficients, etc., described above, a lookup table (LUT) 170a may be, for example, established in the memory 170 of the control device 110. FIG. 7 illustrates one such lookup table 170a. In this lookup table 170a, filter coefficient comparison tables 170_1 to 170_n for various situations may be established for each of the control points (n=1 to N). In this way, the filter coefficients of ΔP, ΔC, and the acoustic characteristic ĉ corresponding to each of the control points may be stored in table form.

Figure 8A:
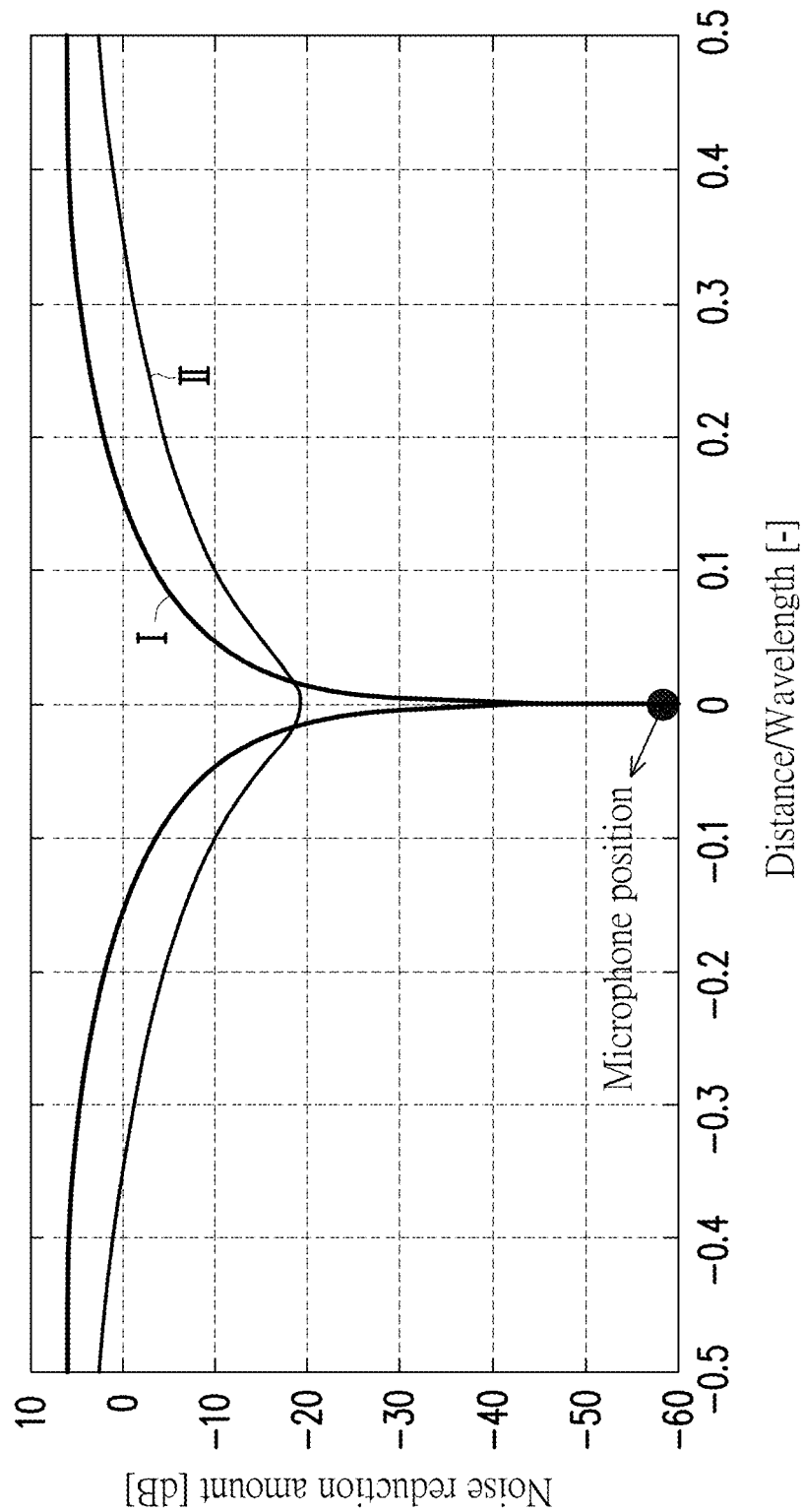
FIG. 8A and FIG. 8B show the difference in effect between the disclosure and a prior art.
Figure 8B:
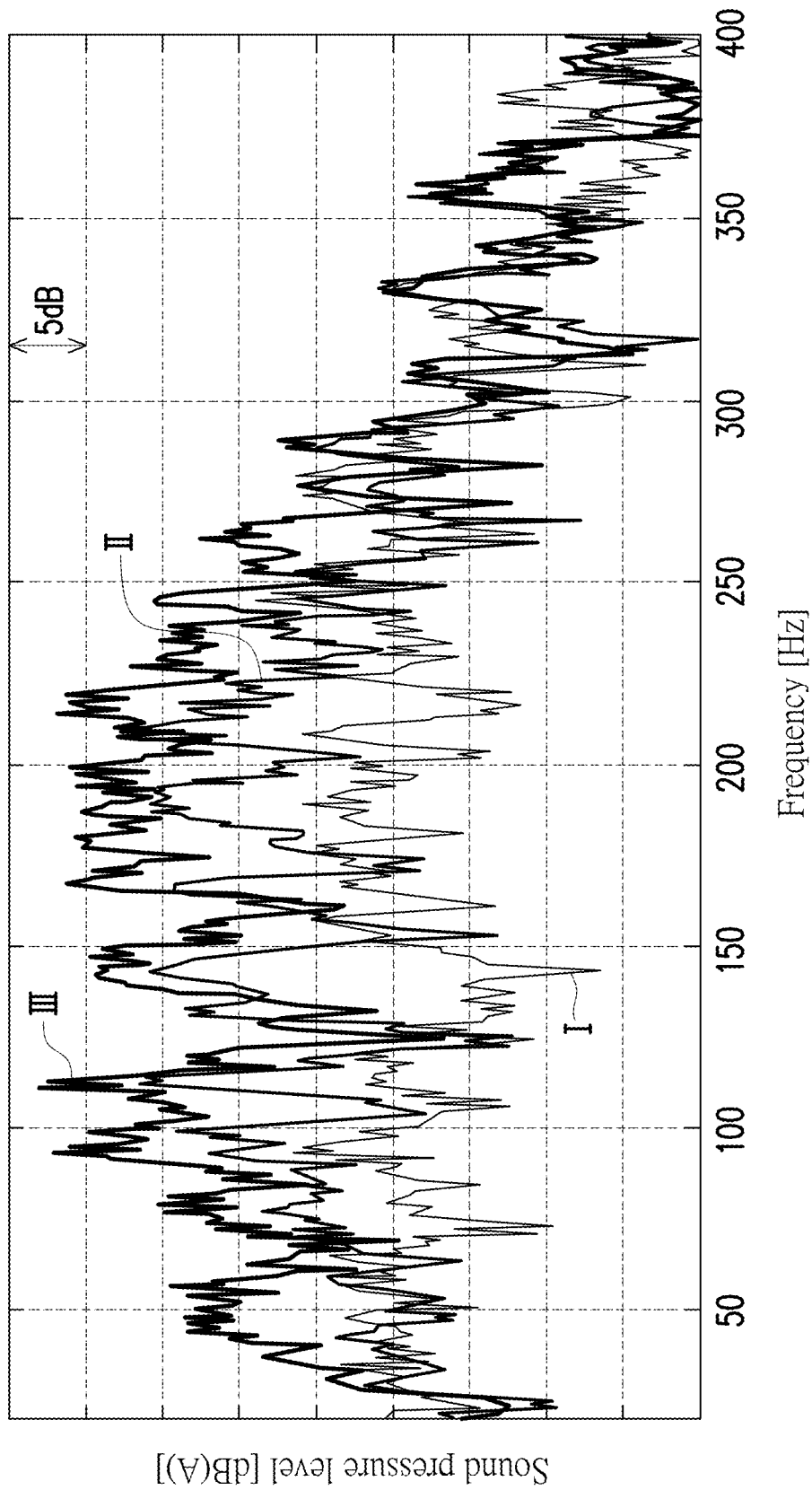

FIG. 8A and FIG. 8B show the difference in effect between the disclosure and a prior art. FIG. 8A shows a relationship diagram between the distance from the position of the microphone 106 and the sound reduction amount (dB), where I represents the prior art and II represents the embodiment of the disclosure. As shown in FIG. 8A, the sound reduction amount becomes lower at the position of the microphone 106, but for the large range area outside, the embodiment of the disclosure may provide a large amount of noise reduction. In particular, according to the embodiment of the disclosure, the noise reduction range of 10 dB may be extended to ⅕ wavelength.

FIG. 8B shows the road noise reduction effect near the ears, where the horizontal axis is the frequency (Hz) and the vertical axis is the sound pressure level (SPL (dB)). In FIG. 8B, I represents the embodiment of the disclosure (with ANC turned on), II represents the prior art (with ANC turned on), and III represents that the ANC is turned off. It may be seen from FIG. 8B that the embodiment of the disclosure has a good noise reduction effect on the road noise near the occupant's ears.

According to the above embodiment, the control range of noise reduction may be expanded without increasing the amount of the microphone (error detection device). Furthermore, the area to implement a high sound reduction amount within the object range may be freely adjusted. Moreover, by correctly recognizing the correction characteristic, the acoustic power within the object range may be more accurately estimated from the signal of the microphone position. In addition, according to the control point, necessary acoustic characteristics and correction characteristics may be stored in the control device.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments can still be modified, or parts or all of the technical features thereof can be equivalently replaced; however, these modifications or substitutions do not deviate the essence of the corresponding technical solutions from the scope of the technical solutions of the embodiments of the disclosure.

What is claimed is:

1. An active noise canceller device, reducing spatial noise inside a moving body, comprising:
   a reference signal generation device, generating a reference signal corresponding to a noise;
   a cancellation sound output device, outputting cancellation sound for canceling the noise;
   an error detection device, detecting an error between the noise and the cancellation sound and generating an error signal corresponding to the error; and
   a control device, controlling the cancellation sound output device according to the reference signal and the error signal,
   wherein the control device further comprises:
   a reference signal correction part, configured to correct the reference signal;
   a noise estimation part, estimating a sound pressure before controlling a position of the error detection device through the cancellation sound output from the cancellation sound output device and the error signal output from the error detection device;
   a sound pressure estimation part, estimating the sound pressure within an object range of the cancellation sound that cancels the noise; and
   a control filter, controlling the cancellation sound, wherein
   the control filter is updated based on the reference signal corrected by the reference signal correction part and a sound pressure estimated value of the sound pressure estimation part,
   wherein the active noise canceller device further comprises:
   a reference distance detection device, configured to detect a reference distance from the cancellation sound output device to a head position of an occupant, wherein
   the sound pressure estimation part sets the object range from the reference distance and updates the control filter.

2. The active noise canceller device according to claim 1, wherein the control device further comprises:
   a sound pressure weight setting part, correcting the sound pressure estimated value based on the object range.

3. The active noise canceller device according to claim 1, wherein the control device further comprises:
   a head position detection part, detecting the head position of the occupant; and
   a sound pressure weight setting part, correcting the sound pressure estimated value based on the object range and the head position.

* * * * *